May 10, 1960 J. G. O'NEIL 2,935,919
METHOD AND MACHINE FOR MAKING A CONTAINER
Filed Nov. 8, 1956 9 Sheets-Sheet 1
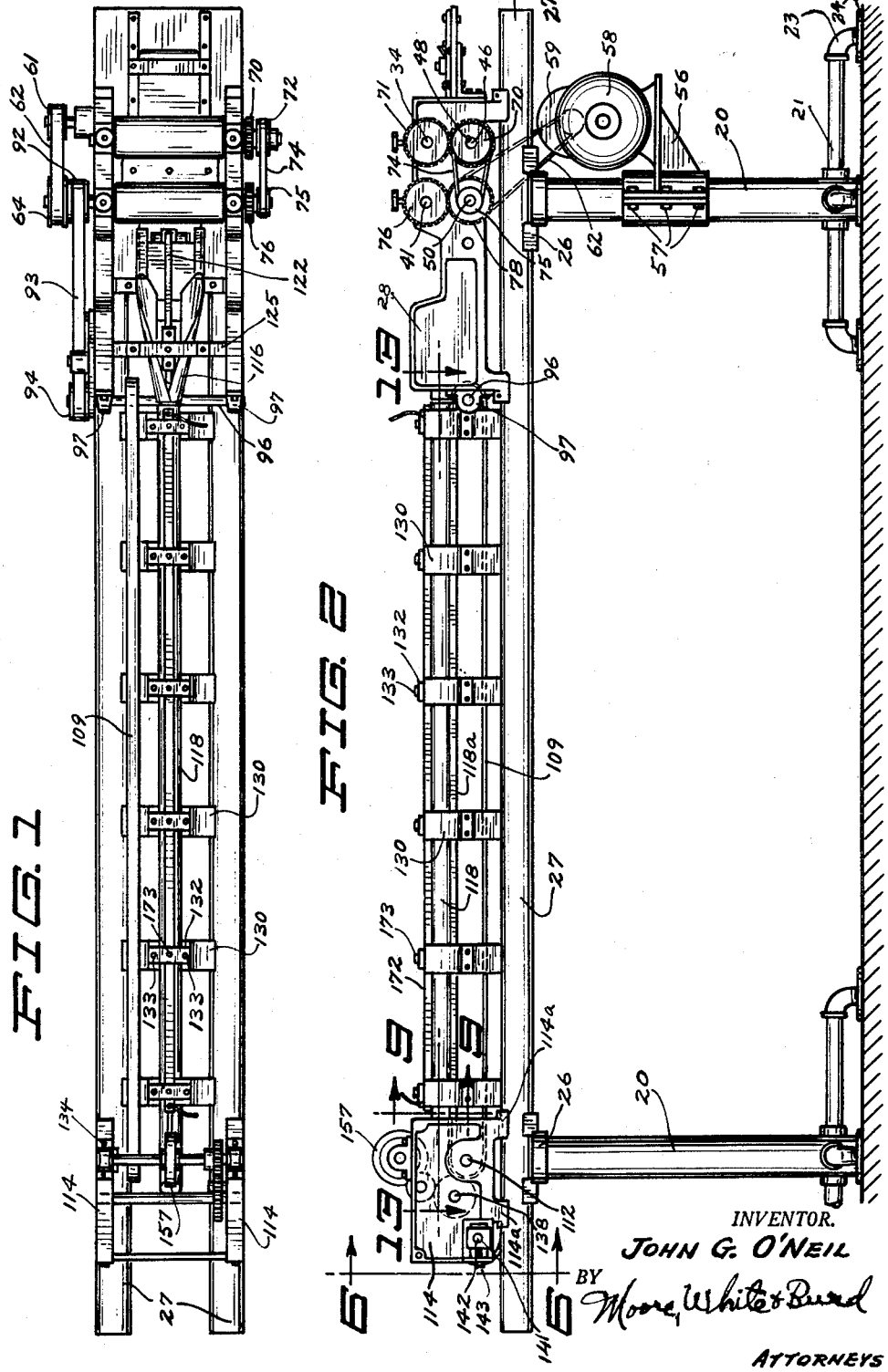
INVENTOR.
JOHN G. O'NEIL
BY Moore, White & Burd
ATTORNEYS

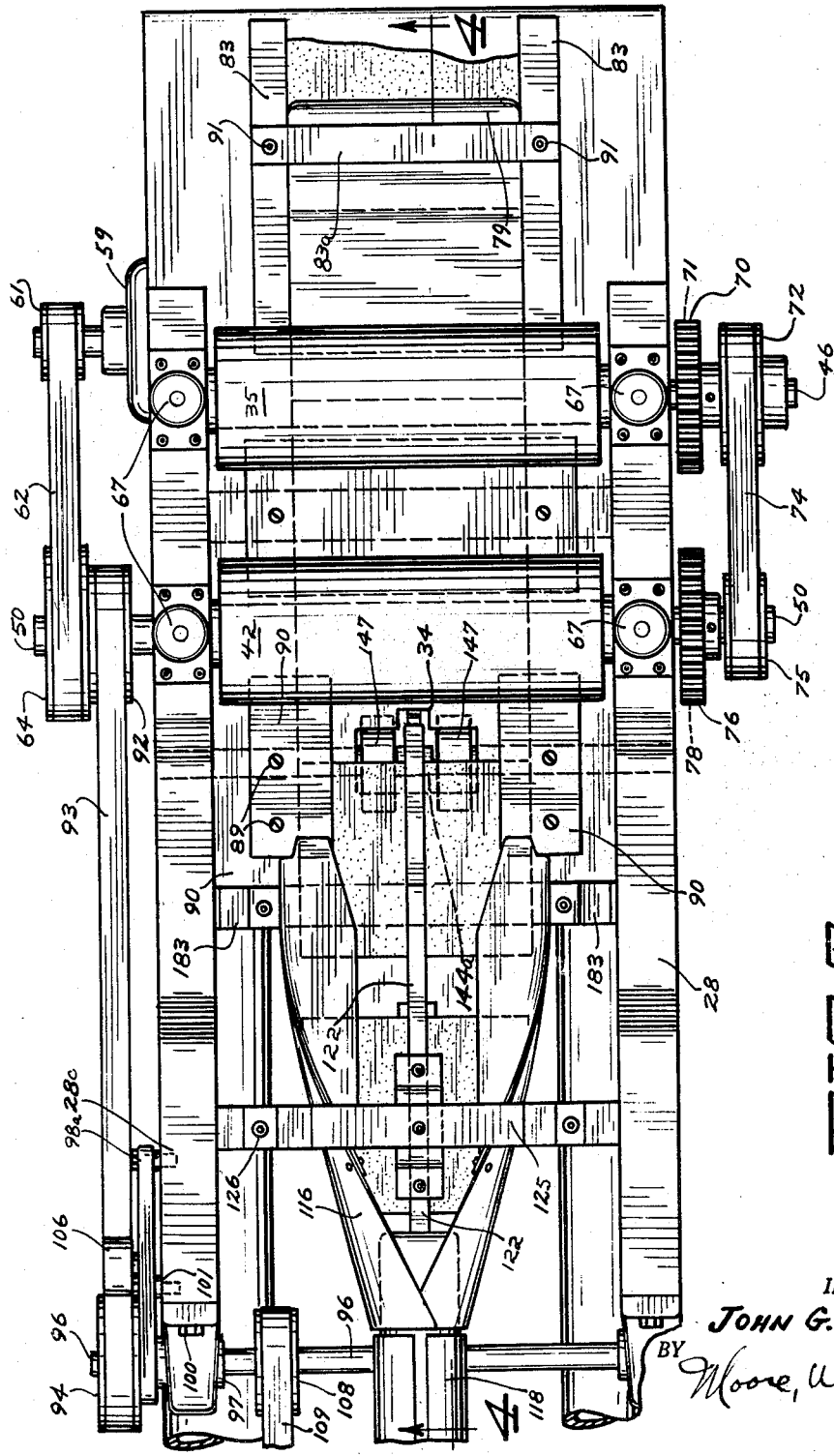

May 10, 1960

J. G. O'NEIL 2,935,919

METHOD AND MACHINE FOR MAKING A CONTAINER

Filed Nov. 8, 1956

INVENTOR.
JOHN G. O'NEIL
BY
Moore, White & Burd
ATTORNEYS

May 10, 1960  J. G. O'NEIL  2,935,919
METHOD AND MACHINE FOR MAKING A CONTAINER
Filed Nov. 8, 1956  9 Sheets-Sheet 4
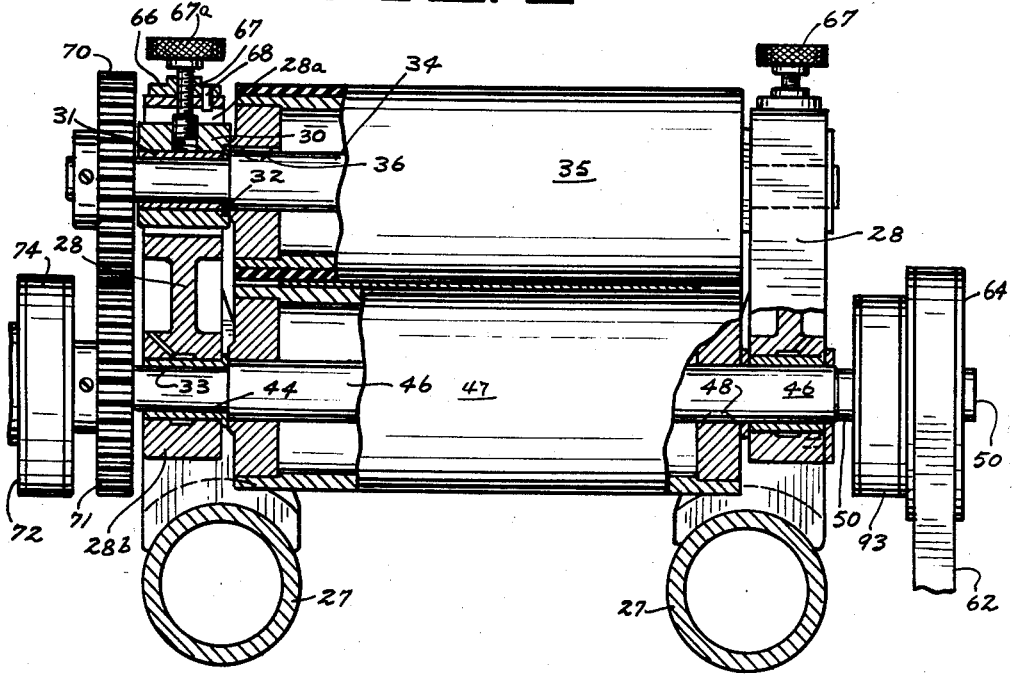
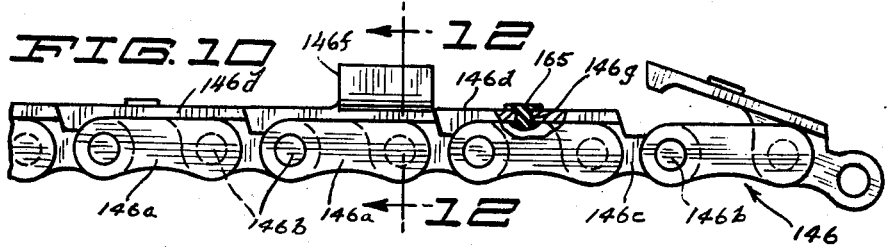
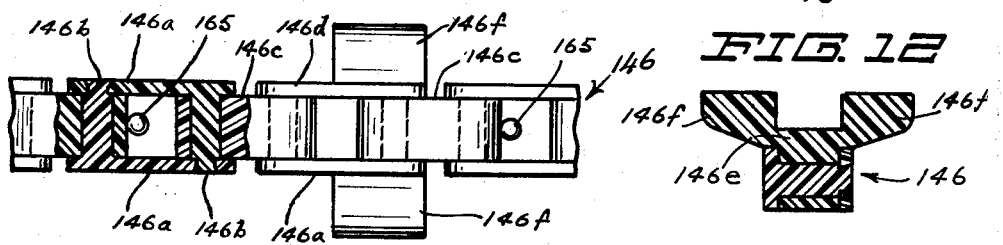
INVENTOR.
JOHN G. O'NEIL
BY
Moore, White & Dud
ATTORNEYS

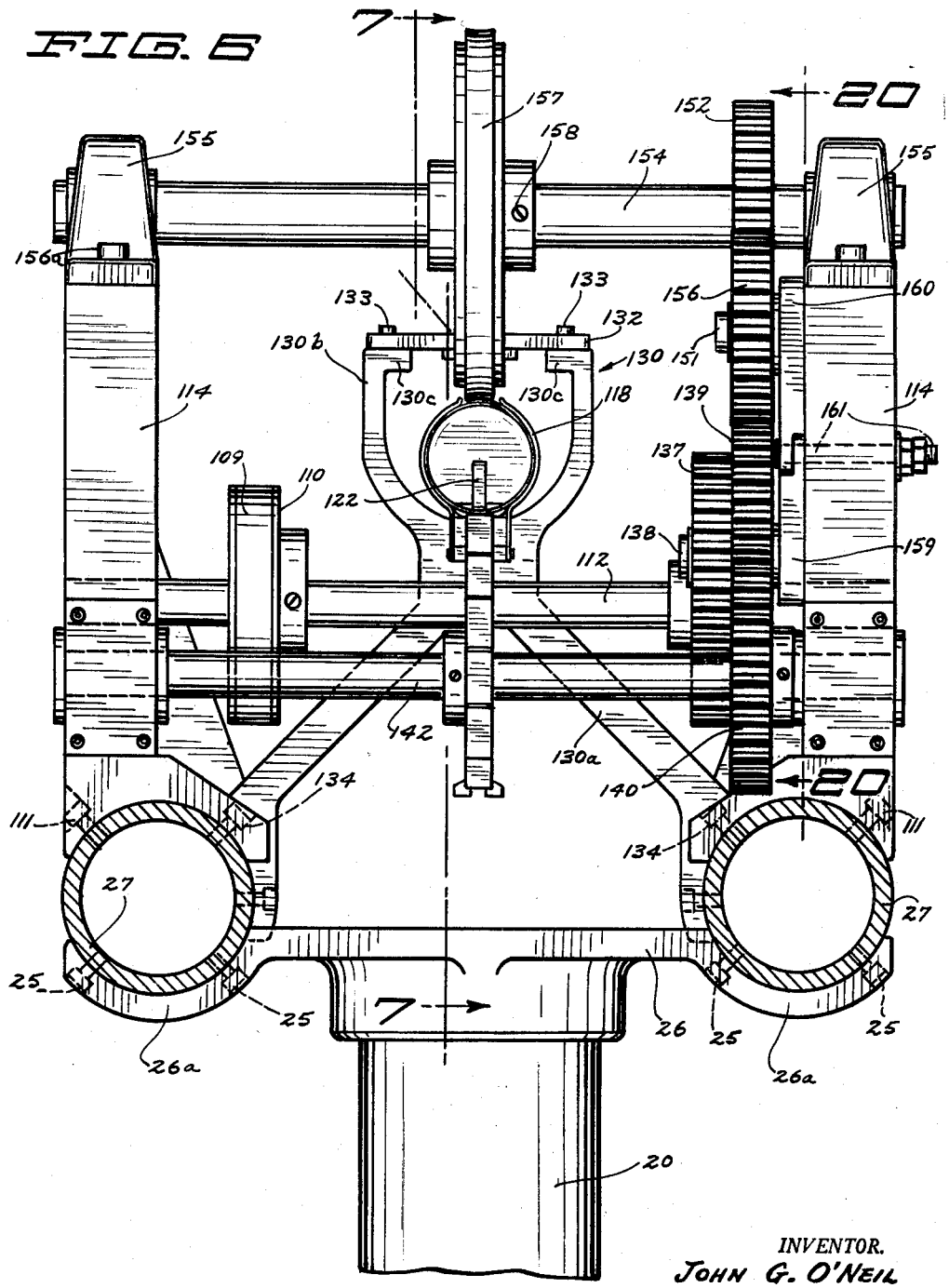

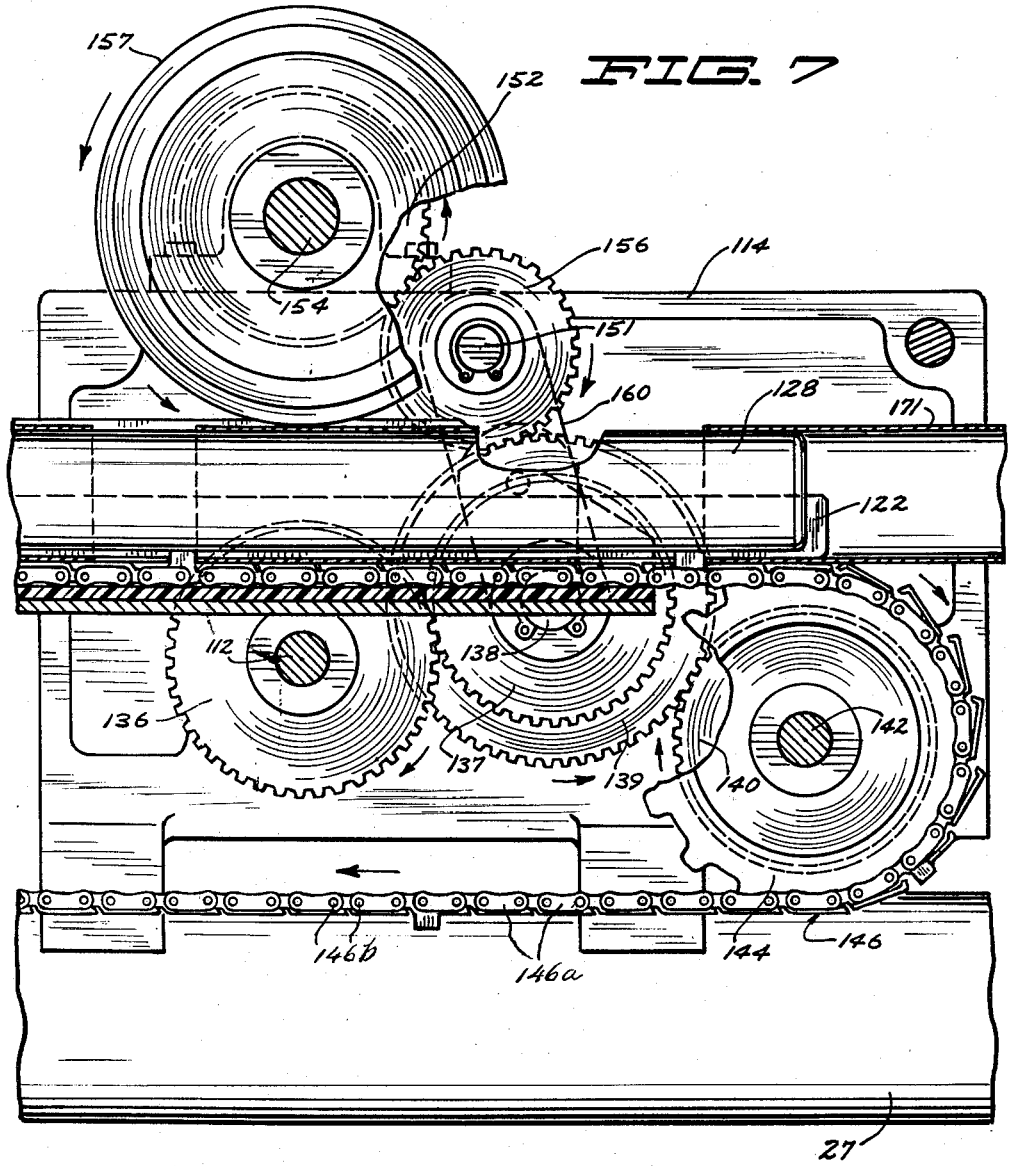

May 10, 1960 J. G. O'NEIL 2,935,919
METHOD AND MACHINE FOR MAKING A CONTAINER
Filed Nov. 8, 1956 9 Sheets-Sheet 7
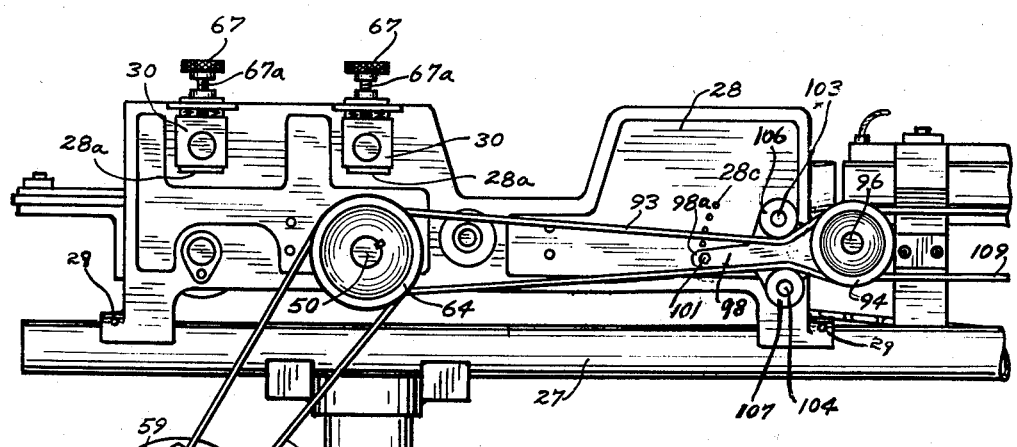
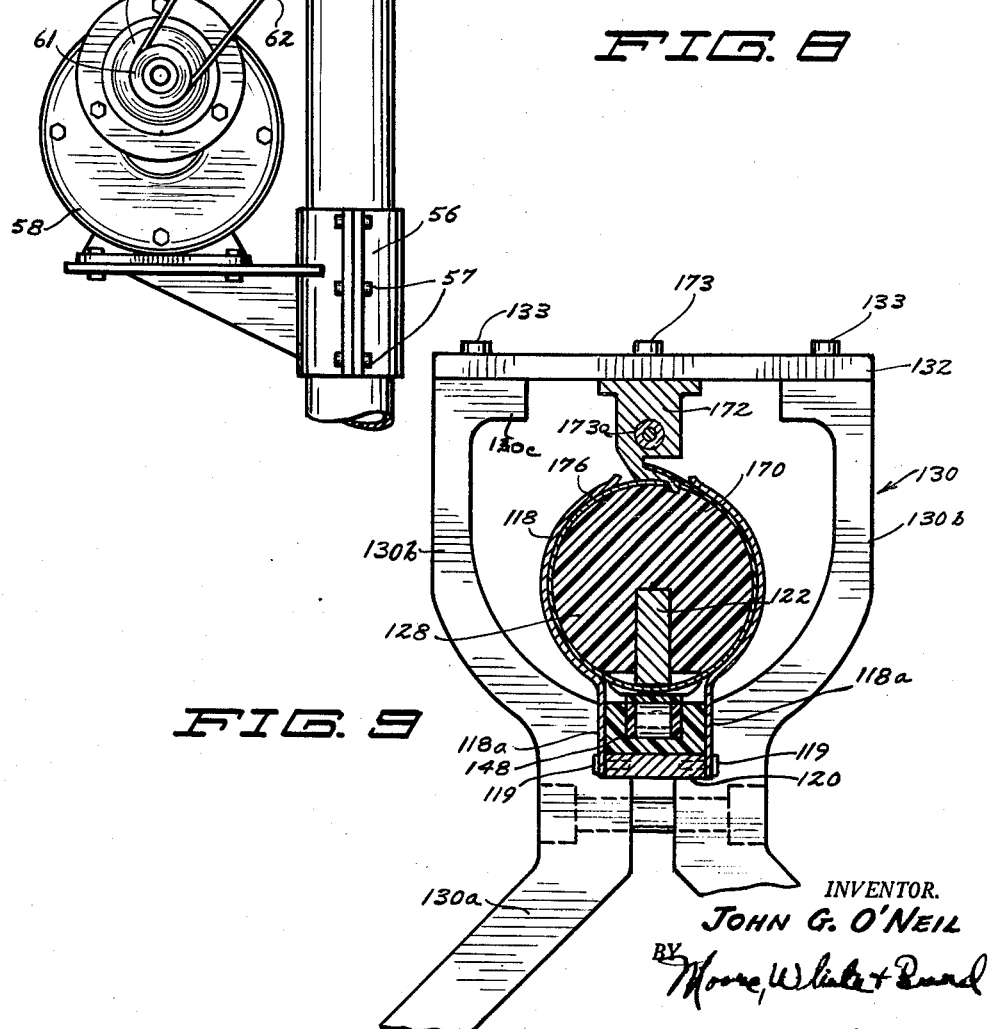
INVENTOR.
JOHN G. O'NEIL
ATTORNEYS

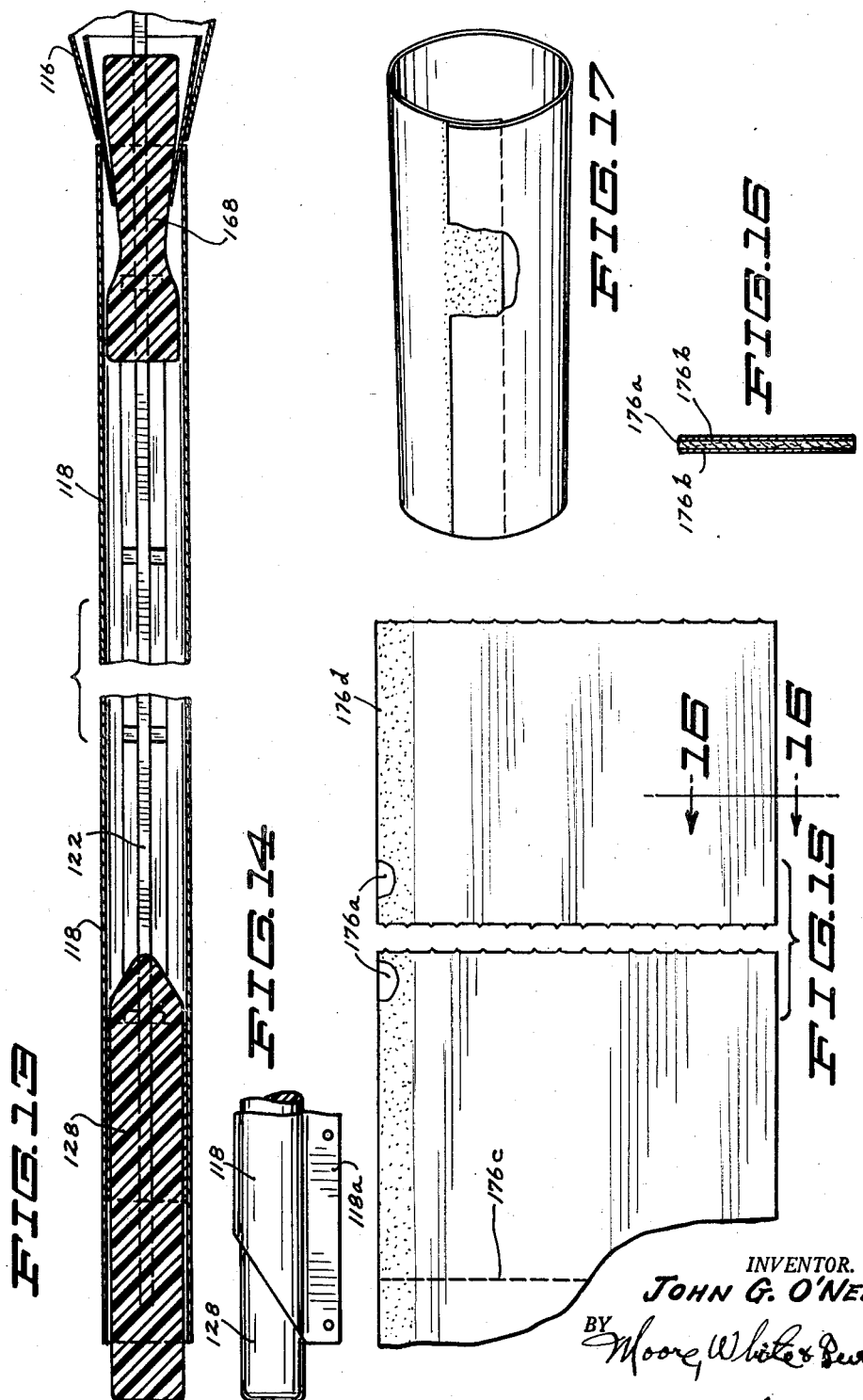

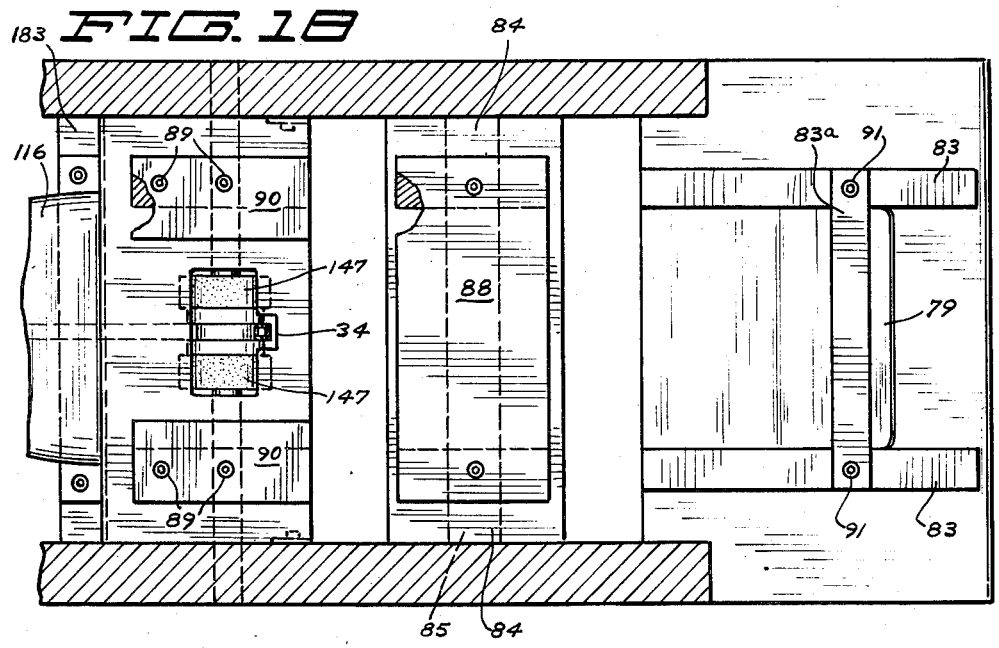
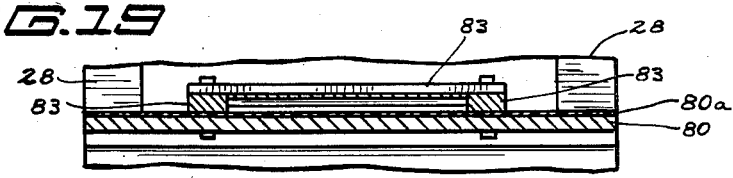
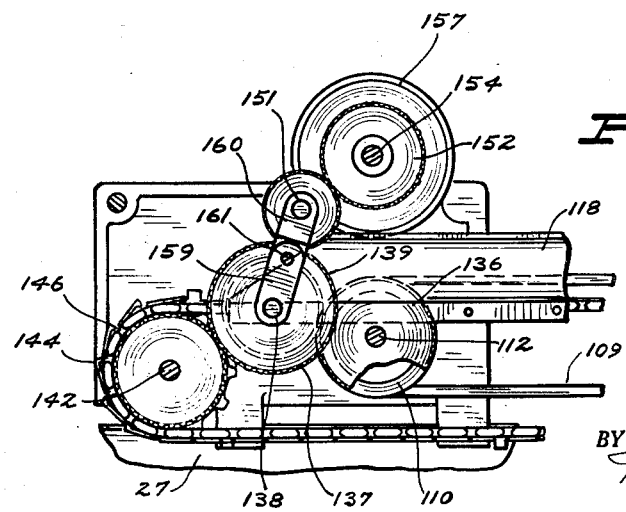
INVENTOR.
JOHN G. O'NEIL

United States Patent Office 2,935,919
Patented May 10, 1960

2,935,919

METHOD AND MACHINE FOR MAKING A CONTAINER

John G. O'Neil, Minneapolis, Minn., assignor to Rapinwax Paper Company, Minneapolis, Minn., a corporation of Minnesota Application November 8, 1956, Serial No. 621,085

8 Claims. (Cl. 93—82)

This invention relates to a method and machine for making a container. The machine is particularly designed to make cylindrical containers although other shapes of containers could be made with no basic change in the machine. Cylindrical containers made of stiff suitably coated paper or light cardboard are now used in great numbers. It is desirable therefore to have a method and machine for rapidly producing such containers.

It is an object of this invention to produce a container-making machine which is quite simple in structure.

It is another object of the invention to make a container of suitable flexible sheet material which is put into the machine in the form of a strip.

It is a further object of the invention to provide a machine as set forth in the preceding paragraph, in which the strip is provided with spaced transversely extending weakened lines along which the strip can be separated or ruptured.

It is also an object of the invention to provide a machine as set forth in the two preceding paragraphs, said machine having means for successively severing pieces from said strip and advancing the same.

It is a further object of the invention to provide a machine having a pair of rollers for advancing a strip of flexible sheet material having lines of weakening extending transversely thereof along which it may be separated, said rollers rotating at a certain speed, and a second pair of rollers engaging said strip to advance the same and running at higher speed whereby a piece will be severed from said strip.

It is another object of the invention to provide a machine having means for gradually folding the sides of a piece of flexible sheet material inwardly and upwardly in curved form to bring the piece into cylindrical form, together with means for engaging said piece to keep it from being objectionably creased or distorted.

It is also an object of the invention to provide a machine having a novel means for heating the adjacent surfaces of the overlapping sides of a piece of flexible sheet material when in substantially cylindrical form so that the coating on said sides will be softened for sealing purposes.

Another object of this invention is to provide a novel means for supporting and advancing pieces of flexible sheet material as they are being folded and otherwise operated upon.

It is an object of the invention to provide a machine as set forth in the preceding paragraph, in which said means comprises a chain having pivoted links with flat top surfaces which come into position forming a flat substantially continuous supporting surface for said pieces, said chain also having means thereon for engaging the edges of said pieces and progressing the same.

It is also an object of this invention to provide a machine comprising an elongated tube-like member having an opening at its bottom, a chain running beneath said opening for supporting a piece of flexible sheet material of substantially cylindrical form in said tube, together with a member within said tube for holding said piece against said chain for maintaining the cylindrical form of said piece.

It is a further object of this invention to provide such a structure as set forth in the preceding paragraph, said chain having means thereon engaging the end of said piece for progressing the same in said tube.

It is further an object of this invention to provide the structure set forth in the preceding paragraph save one, in which a U-shaped member of tetrafluoroethylene polymer ("Teflon") is provided in which said chain fits and moves.

It is still another object of this invention to provide means for advancing a rectangular piece of flexible sheet material, means for gradually folding said sheet into cylindrical form, a substantially cylindrical structure into which said piece is moved, and a mandrel in said structure having a diameter at its end slightly less than the inside diameter of said structure and having a portion somewhat adjacent one of said ends of considerably smaller diameter, the surface of said mandrel tapering to said part of smaller diameter.

These and other objects and advantages of the invention will be fully set forth in the following description made in connection with the accompanying drawings in which like reference characters refer to similar parts throughout the several views and in which:

Fig. 1 is a top plan view of the machine of this invention;

Fig. 2 is a view in side elevation of said machine;

Fig. 3 is a partial plan view of said machine shown on an enlarged scale;

Fig. 5 is a partial view partly in front elevation and partly in vertical section taken on line 5—5 of Fig. 4, as indicated by the arrows;

Fig. 6 is a vertical section taken on line 6—6 of Fig. 2, as indicated by the arrows;

Fig. 7 is a vertical section taken on line 7—7 of Fig. 6, as indicated by the arrows;

Fig. 8 is a partial plan view of the machine of this invention shown on an enlarged scale;

Fig. 9 is a vertical section taken on line 9—9 of Fig. 2, as indicated by the arrows;

Fig. 10 is a partial view in side elevation of a chain used with the present invention;

Fig. 11 is a partial plan view of said chain shown partly in horizontal section;

Fig. 12 is a vertical section taken on line 12—12 of Fig. 10, as indicated by the arrows;

Fig. 13 is a partial view partly in plan and partly in central longitudinal vertical section taken on line 13—13 of Fig. 2, as indicated by the arrows;

Fig. 14 is a partial view in side elevation of a forming member used;

Fig. 15 is a partial plan view of a strip from which the containers are made and showing a piece detached from said strip;

Fig. 16 is a vertical section taken on line 16—16 of Fig. 15, as indicated by the arrows;

Fig. 17 is a view of the cylindrical body of a container as made in accordance with the present invention;

Fig. 18 is a horizontal section taken on line 18—18 of Fig. 4, as indicated by the arrows;

Fig. 19 is a vertical section shown on line 19—19 of Fig. 4, as indicated by the arrows; and Fig. 20 is a vertical section taken on line 20—20 of Fig. 6, as indicated by the arrows.

Figure 4:
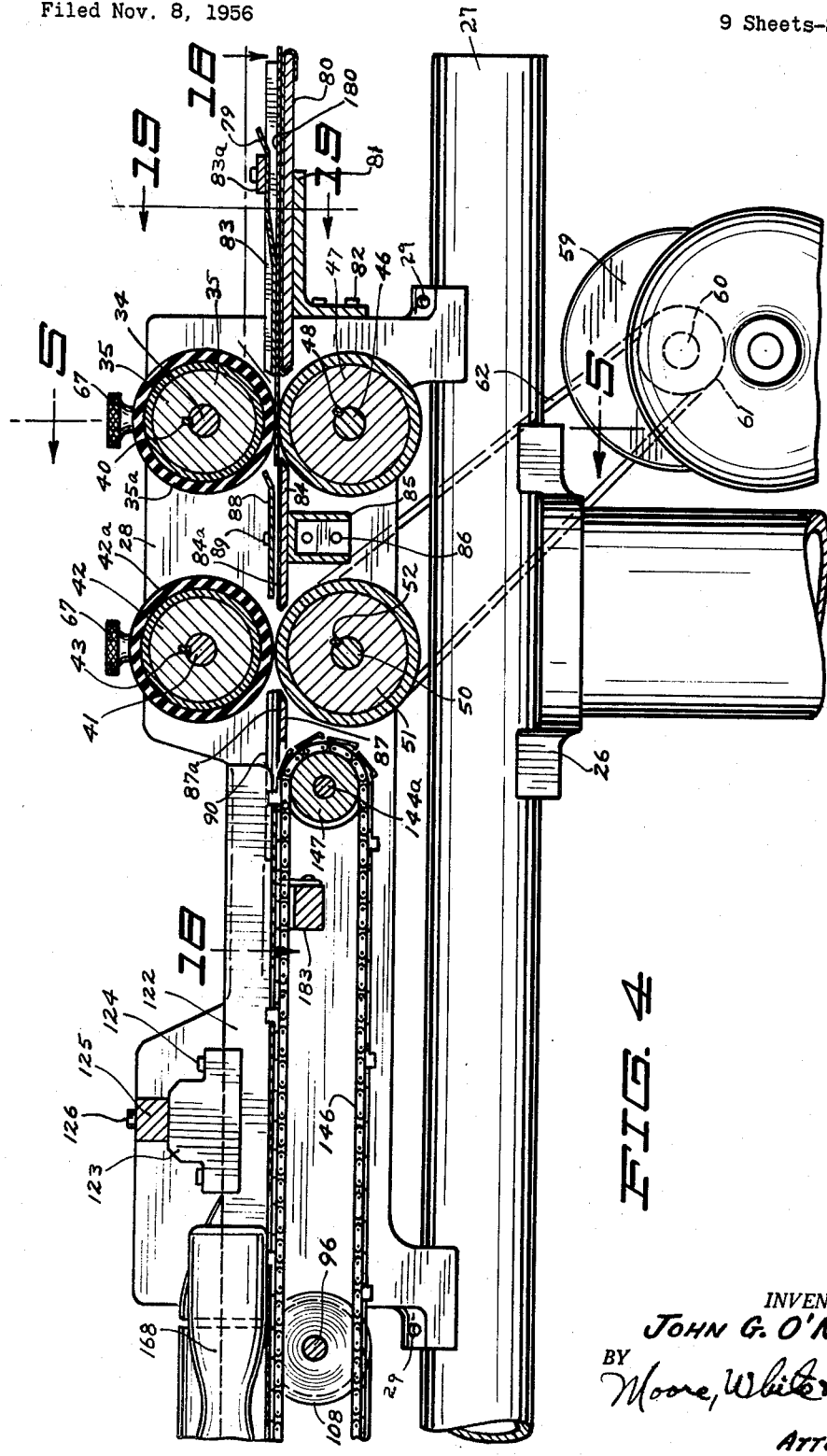
Fig. 4 is a partial vertical section taken on line 4—4 of Fig. 3, as indicated by the arrows.

Referring to the drawings, the machine comprises a frame having vertical supporting members 20 shown as of cylindrical form, the same having a plurality of arms 21 at their bottoms extending outwardly and horizontally therefrom and secured thereto. While members 21 could have various forms, in the embodiment of the invention illustrated they are shown as made of pipes threaded into the members 20, the same having elbows 23 at their outer ends to which are attached collars 24 having flat lower sides engaging the supporting surface. Members 21 are shown as four in number and are disposed at right angles to each other. Members 20 have secured to their upper ends, brackets 26, as shown in Figs. 2, 4 and 8. Brackets 26 have portions extending laterally from members 20 which at their outer parts have semicylindrical surfaces 26a. Cylindrical members or pipes 27 are disposed on brackets 26 fitting in the surfaces 26a. As shown in Figs. 1 and 2, members 27 extend between members 20 and some distance beyond the same. Brackets 26 are secured to members 27 by screws 25.

At the front end of the machine, brackets 28 are provided which have lower portions resting on the members 27. Screws 29 secure members 28 to members 27. Members 28 at their upper ends are each provided with a pair of spaced rectangular openings 28a in which are disposed vertically movable bearing blocks 30. Bearing blocks 30 are provided with bushings 31 and washers 32 are disposed at the inner ends of bushings 31. A shaft 34 has reduced portions journaled in the upper forward bushings 31. A roller 35 is secured to shaft 34 by any suitable means, such as the key 36, said roller having an outer layer 35a of resilient material, such as rubber or similar material. Similar blocks 30 are disposed in the rear openings 28a which are also provided with bushings 31 and washers 32. A shaft 41 has reduced portions journaled in the bushings in the rear blocks 30, and a roller 42 is secured to shaft 41 in any suitable manner, as by the key 43. Roller 42 also has an outer layer 42a of resilient material, such as rubber or other suitable material. Brackets 28 also have hubs 28b bored to receive bushings 44 having flanged inner ends. A shaft 46 is journaled in the forward bushings 44 and a roller 47 is secured to shaft 46 in any suitable manner, as by the key 48. A shaft 50 is journaled in the rear bushings 44, the same having secured thereto by key 52 a roller 51. It will be noted that rollers 35, 42, 51 and 54 have hub portions at their ends to which are secured the cylindrical portions of the rollers, as shown in Fig. 5.

A bracket 56 has a split hub surrounding one of the members 20 and is secured to the latter by a plurality of bolts 57. An electric motor 58 is supported on bracket 56 and has a speed reducing mechanism 59 in conjunction therewith having a shaft 60 to which is secured a pulley 61. A belt 62 runs over pulley 61 and also over a pulley 64 secured to the outer end of shaft 50. The bearing blocks 30 are drilled and tapped at their top sides and a screw 67 has a lower portion threaded into said tapped opening in each of said blocks. Screws 67 are also threaded into the top of brackets 28 and in a nut 66 secured to the top of said bracket by a pin 68. Screws 67 have knurled heads 67a at their upper portions by which they can be conveniently rotated. By rotating screws 67 the blocks 30 can be raised and lowered to vary the engagement of rollers 35 and 47, and 42 and 51. Shaft 34 has secured adjacent one end a gear 70 which meshes with a gear 71 secured to shaft 46. Shaft 46 has secured thereto outside of gear 71 a pulley 72 over which runs a belt 74 also running over a pulley 75 of smaller diameter than pulley 72 and which is secured to shaft 50. A gear 76 is secured to shaft 41, the same meshing with a gear 78 secured to shaft 50. (See Fig. 2.)

A plate 80 is supported on a bracket 81, secured to brackets 28 by bolts 82. A plate 84 is supported on a bracket 85, which latter is secured to brackets 28 by bolts 86. Another plate 87 extends rearwardly from rollers 42 and 51 for a short distance, as shown in Fig. 4. Plate 87 is supported from a bar extending between and secured to brackets 28. Spaced plates 90 have inner portions spaced a short distance above plate 87 and coextensive longitudinally therewith. Plates 90 are supported from bar 83. Plates 80 and 84 have ends disposed adjacent roller 54 and are beveled at said ends. Plates 84 and 87 have ends closely adjacent roller 51 and said ends are beveled. Plates 80, 84 and 87 have secured to their top surfaces, thin layers 80a, 84a and 87a of tetrafluoroethylene polymer ("Teflon"), having a very smooth top surface. A plate 88 overlies plate 84 and layer 84a, the same being spaced from the latter and having its end adjacent roller 35 upturned. Plate 88 is held in place by bolts 89 extending into bracket 85. Spaced flat and narrow bars 83 extend longitudinally and centrally above plate 80, the same being connected by a transversely extending bar 83a secured thereto by screws 91. A plate 79 extends under bars 83 and is secured thereto. The front end of plate 79 is turned upwardly. Plate 79 is spaced slightly above layer 80a.

A pulley 92 is secured to shaft 50 and a belt 93 runs thereover and over a pulley 94 secured to a shaft 96 carried in bearings 97 supported on brackets 28. A swingable bracket 98 about shaft 96 has secured therein shafts 103 and 104 on which are journaled rollers 106 and 107 disposed at the outer sides of the two runs of belt 93. Movement of bracket 98 causes rollers 106 and 107 to flex the sides of belt 93 inwardly to apply pressure or relieve pressure on the driving run of belt 93. This varies the speed of revolution of pulley 94 and shaft 96 and thus the speed of shaft 112 and of chain 146. Said bracket 98 carries a handle 101 which is provided with a pin adapted to be entered in any one of a plurality of holes 28c in the side of bracket 28 to hold bracket 98 in different positions. Moving bracket 98 varies the position of shaft 96. Bolt 100 is tightened by nuts 102.

A pulley 108 is secured to shaft 96 over which runs a belt 109 which extends rearwardly for quite a distance and also runs over a pulley 110 secured to a shaft 112 journaled at its ends respectively in brackets 114. Brackets 114 are similar to brackets 28 and have lower portions 114a resting on and adapted to fit over the members 27. Brackets 114 are secured to members 27 by bolts 111.

A forming member is provided in the form of a casing 116 which has its sides bent upwardly and inwardly in curved form, the same at the rear of said casing overlapping and being in substantially cylindrical form. The inwardly and upwardly bent sides converge gradually toward the rear and are substantially flat at their front ends, said front ends being substantially in the plane of layer 87a. Casing 116 is supported on a bar 183. A substantially cylindrical tube 118 has its front end closely adjacent the rear end of casing 116 and extends for a long distance rearwardly. Said tube is open at its lower side, the sides 118a thereof being bent to extend downwardly in parallel relation and secured by screws 119 to a bar 120. A bar 122 is disposed in tube 118 centrally at the lower side thereof, the same being secured at its front end to a bracket 123 by bolts 124. Bracket 123 is supported by and secured to a bar 125 by screws 126. Bar 125 extends between brackets 28 and is secured thereto at its ends. Bar 122 extends throughout the length of tube 118 and is secured in any suitable manner, as by welding, at its rear end to a rear mandrel 128, which mandrel is disposed within tube 118. Bar 122 is disposed in a slot in mandrel 128, as shown in Fig. 9.

A plurality of brackets 130 are provided spaced longitudinally along members 27, the same having downwardly diverging portions 130a, the terminals of which have curved surfaces fitting about members 27. Said terminals are secured to members 27 by a plurality of Allen headed screws 131. At their upper ends, brackets 130 have spaced arms 130b extending from the central portion of said bracket and curving outwardly and upwardly in diverging relation, the same having parallel vertical upper portions provided with inwardly extending ends 130c. Plates 132 overlie the tops of arms 130b respectively and are secured thereto by bolts 133. Brackets 114 have lower portions having bottom surfaces fitting about members 27 and said portions are secured to members 27 by a plurality of screws 134.

Shaft 112 previously referred to, which carries pulley 110, has secured thereto a gear 136 which meshes with a gear 137 secured to a shaft 138 having its ends journaled in bearings in brackets 114. Shaft 138 also carries a gear 139 which meshes with a gear 140 secured to a shaft 142 having its ends journaled in bearings 141 in brackets 114. Bearings 141 are adjustable by screws 143. Shaft 142 has secured thereto a sprocket 144 over which runs a chain 146 of special form. Chain 146 can be adjusted by moving bearings 141. Chain 146 runs forwardly for quite a distance and runs over a roller 145a secured to shaft 144a. Roller 145a has a smooth surface in which is formed a rectangular groove in which chain 146 is disposed. At each side of roller 145a are rollers 147 secured to shaft 144a, said rollers being called "pusher" rollers, the same being arranged to engage and move the pieces of material from which the containers are formed. The rollers 147 have their top surfaces projecting above the top surface of plate 87 and substantially in the plane of the top of roller 51. Plate 87 has an opening 34 therein through which rollers 145a and 147 project. Supported upon the member 120 is a trough-shaped member 148. While this member might be made of other materials, in practice it has been made of "Teflon," which substance has very small friction. A section of the chain 146 is shown disposed in the member 148.

The gear 150 meshes with a gear 152 secured to a shaft 154 having its ends journaled in bearings 155, which bearings are flanged and secured to the tops of brackets 114 by bolts 156a. A presser wheel 157 is secured to shaft 154 in any suitable manner, as by the set screw 158 extending through the hub of said wheel. The gears 156 and 139 form idler gears. Other gears may be used of different diameters than said gears and placed on the shafts 151 and 138. A toggle mechanism is provided having links 159 and 160 connected by a pivot bolt 161. Links 159 and 160 have elongated slots in their end portions. Shafts on which gears are journaled are disposed in said slots and may be clamped thereon. The links 159 and 160 can be moved about pivot 161 to bring the two meshing gears into mesh respectively with gears 140 and 152. Pivot bolt 161 which moves in a slot (not shown) in bracket 114 can then be tightened and the idle gears are held firmly in meshing position.

The chain 146 comprises links 146a being pivoted at their ends by headed pins 146b to shorter links 146c. Links 146c have secured thereto and preferably formed integral therewith, plates 146d. Plates 146d have flat top surfaces and said plates have beveled ends so that the plates on successive links are substantially in contact. Plates 146d can swing with links 146c about pins 146b. Certain of the links 146c and specifically the plate portion 146d have secured thereto a portion 146e having spaced vertically extending lugs 146f, as shown in Figs. 10 to 12. Plates 146d have holes 146g therein and headed members 165 may be fixed therein. Members 146c can be made of rubber or other friction material.

Disposed in tube 118 and extending somewhat into casing 116 is a member 168. Member 168 has a diameter at its front end portion, which portion substantially fits in the tube 118. Member 168 gradually decreases in diameter rearwardly for a short distance and then flares into the same diameter as its other or front end. Member 168 constitutes a mandrel which may be said to be of wasp-waist form. Bar 122 extends somewhat beyond rear mandrel 128.

A heating member 172 is secured to one of the bars 132 by a screw 173 and extends for some distance longitudinally of member 118. Member 172 is bored to have an electric conductor 173a disposed therein. When the piece 176 from which the container is formed is folded in casing 116, the edge portions which are at the top come into overlapping relation, as shown in Fig. 9. Member 172 has a depending portion terminating in a V-shaped blade which extends between said overlapping portions. The pieces are coated with a substance which softens and becomes adhesive upon the application of heat.

In operation, a strip of material 180 is used, and while a single strip of suitable paper or light cardboard or other construction of strip might be used, in practice a strip 176a formed of paper or light cardboard is used and on either side of which a layer of aluminum foil 176b is secured. Said layers of aluminum foil are secured to strip 176a by a suitable adhesive. The aluminum foil is coated with a suitable lacquer to waterproof it and to provide sealing qualities. Upon heating the lacquer softens and then becomes an adhesive. The strip 176a has been provided with transversely extending separating or weakening lines or portions 176c, such as creases or lines of perforation. This strip is started in the machine and passes between the plate 79 and the layer 80a and is brought into engagement with the progressing rollers 31 and 42. The strip is progressed and moves between plate 88 and layer 84a into engagement with rollers 42 and 51. As stated, rollers 42 and 51 rotate at higher speed than rollers 35 and 47 and this puts a stress upon the strip which severs the same along one of the lines 176c to successively form single pieces 176d. These pieces are moved by rollers 42 and 51 between plate 90 and layer 87a and come over the pushing rollers 147. They are thus advanced by said pushing rollers and move from between plate 90 and layer 87a to a position between the top of chain 146 and bar 122. As described, said chain 146 has portions thereon with lugs 146f, which lugs engage the front side of the pieces 176d and continue to move the same. The pieces move into the forming casing 116 and are gradually folded into cylindrical form. The folded piece moves from the forming casing 116 into the front end of the substantially cylindrical member 118. The folded piece moves between the casing 118 and the mandrel 168 shown in Figs. 4 and 13. When a rectangular piece of material is folded in the folding casing 116 the front corners come into position so that the forward lines of said corners extend forwardly and cross each other. This reduces the diameter of said advancing end of the folded piece. If this folded piece is progressed over a uniformly cylindrical mandrel, there is danger of creasing or distorting the front end of the piece. This has been avoided by having the wasp-waist mandrel 168 which provides a space between said mandrel and the casing 118 for the ends of the advancing piece to enter. As the folded piece advances, the forward ends can then again be brought to the larger diameter at the rear end of mandrel 168. The cylindrical pieces are now advanced by chain 146 through the casing 118. As shown in Fig. 9, the bar 122 holds the lower portion of the folded piece against the chain and thus preserves the cylindrical form of the folded piece. The piece is folded so that the upper edges thereof overlap, as shown in Fig. 9. The folded piece is progressed until it meets member 172 and the blade-like terminal of said member is disposed between the overlapping edges of the folded piece. Member 172 is heated and the heat sensitive lacquer with which both sides of the piece are coated is softened by the heat and then forms an adhesive. The piece is progressed and comes under the presser wheel 157 which presses the overlapped portions together and against the rear mandrel 128 so that portions are firmly sealed together. The sealed and folded piece is progressed by the chain 146 and moved off of the rear mandrel 128 and drops into a suitable receptacle. Suitable end closures will then be added to the cylindrical body.

The shaft 96 which carries the forward roller over which chain 146 runs is carried in the brackets 98. Brackets 98 can be swung about the pivot 100. This moves rollers 106 and 107 and swings pulley 94 which will move the front end of the chain 146 forwardly or rearwardly. This adjustment is used to get the chain into the proper position when pieces of different width are used to make the containers. Portions 146d are provided with holes disposed substantially centrally thereof in which may be disposed headed members 165.

While the chain 146 could be made of various materials, in practice the same has been made of nylon. The members 165 may be used in members 146d to provide more friction for the pieces as they engage the top surface of the chain.

From the above description it will be seen that I have provided a comparatively simple and very efficient method and machine for forming containers. The machine can be operated at quite high speed so that the containers can be produced at about 400 per minute. The method and machine have been amply demonstrated in actual practice and found to be very successful and efficient.

It will of course be understood that various changes may be made in the form, details, arrangement and proportions of the apparatus and in the steps and sequence of steps of the method without departing from the scope of applicant's invention, which, generally stated, consists in a method and apparatus capable of carrying out the objects above set forth, such as disclosed and defined in the appended claims.

What is claimed is:

1. A machine for making containers comprising in combination a frame including longitudinally spaced vertical supporting members and longitudinally extending horizontal members mounted thereon; roller drive means at one end of said frame for progressing a strip of flexible sheet material; roller means driven at a greater rate of speed than said roller drive means for successively severing pieces from said strip along lines extending transversely thereof; drive means carried by said frame for engaging an edge of said severed pieces respectively for progressing the same longitudinally to the opposite end of said machine, said drive means for progressing said severed sheets including an endless chain supported in said frame downstream from said second pair of roller means for longitudinal movement, laterally spaced outwardly projecting lugs on said chain for engaging the edges of the successively severed pieces of flexible sheet material and means supported by said frame for moving said chain to progress said pieces; said endless chain comprising pivoted links, said links having flat top surfaces adapted to come into position forming a substantially continuous horizontally disposed flat surface, said surface forming a supporting means for said severed pieces of sheet material; means for folding said severed pieces into tubular form while being progressed longitudinally to the opposite end of said machine and maintaining the pieces in tubular form; and means for securing adjacent overlapping edges of said tubular form together.

2. A machine for making containers comprising in combination a frame including longitudinally spaced vertical supporting members and longitudinally extending horizontal members mounted thereon; roller drive means at one end of said frame for progressing a strip of flexible sheet material; roller means driven at a greater rate of speed than said roller drive means for successively severing pieces from said strip along lines extending transversely thereof; drive means carried by said frame for engaging an edge of said severed pieces respectively for progressing the same longitudinally to the opposite end of said machine; means for folding said severed pieces into tubular form while being so progressed and maintaining the pieces in tubular form, said means for folding successive severed pieces of flexible sheet material into tubular form and maintaining the pieces in tubular form comprising a casing of rigid sheet material having sides curving upwardly from the plane of travel of said pieces and gradually approaching tubular form at one end, a hollow tube adjacent said end of said casing and axially aligned therewith, said tube being of substantially the same shape and diameter as said end, and a mandrel in said tube extending a short distance into said casing, said mandrel being of substantially the same shape and having end portions of slightly lesser diameter than said tube and having a reduced intermediate portion, the surface of said mandrel tapering from adjacent said ends to said intermediate portion; and means for securing adjacent overlapping edges of said tubular form together.

3. A machine for making containers according to claim 2 further characterized in that the end of said casing, said tube and said mandrel are substantially cylindrical in form.

4. A machine for making containers according to claim 2 further characterized in that the lowermost edges of said casing and said tube are provided with longitudinal slots adjacent to and aligned with said endless chain whereby the projecting lugs on said chain extend into said casing and said cylinder to engage the rear edges of said successively severed pieces of flexible sheet material and moves the same through the device.

5. A machine for making containers comprising in combination a frame including longitudinally spaced vertical supporting members and longitudinally extending horizontal members mounted thereon; roller drive means at one end of said frame for progressing a strip of flexible sheet material; roller means driven at a greater rate of speed than said roller drive means for successively severing pieces from said strip along lines extending transversely thereof; drive means carried by said frame for engaging an edge of said severed pieces respectively for progressing the same longitudinally to the opposite end of said machine; means for folding said severed pieces into tubular form while being so progressed and maintaining the pieces in tubular form; and means for securing adjacent overlapping edges of said tubular form together, said means for securing the edges of said tubular form together including a heating device having a V-shaped terminal portion fitting between overlapping edge portions of said tubular form to heat the adjacent surfaces of said portions as the tubular form is moved through the machine, and means for pressing said heated adjacent surfaces together.

6. A machine for making containers comprising in combination a frame including longitudinally spaced vertical supporting members and longitudinally extending horizontal members mounted thereon, roller drive means comprising a pair of vertically spaced rollers at one end of said frame for progressing a strip of flexible sheet material, a second pair of vertically spaced rollers spaced downstream from the first pair of rollers and adapted to rotate at a greater peripheral speed for successively severing pieces from said strip of sheet material along lines extending transversely thereof, drive means for progressing said severed pieces through the machine including an endless chain supported in said frame downstream from said second pair of vertically spaced rollers for longitudinal movement, laterally spaced outwardly projecting lugs on said chain for engaging the edges of the successive severed pieces of sheet material and means supported by said frame for moving said chain to progress the pieces, means for folding successive severed pieces of flexible sheet material into tubular form and maintaining the pieces in tubular form including a casing of rigid sheet material having sides curving upwardly from the plane of travel of said pieces and inwardly and gradually approaching tubular form at one end, a hollow tube adjacent said tubular end of said casing and axially aligned therewith, said tube being of substantially the same shape and diameter as said tubular casing end and a mandrel in said tube extending a short distance into said casing, said mandrel being of substantially the same shape and having end portions of slightly lesser diameter than said tube, and having a reduced intermediate portion, the surface of said mandrel tapering from adjacent said ends to said intermediate portion, the lowermost edges of said casing and said tube being provided with longitudinal slots adjacent to and aligned with said endless chain whereby the projecting lugs on said chain extend into said casing and said cylinder to engage the rear edges of said successively severed pieces of flexible sheet material and move the same through the device, and means for securing adjacent overlapping edges of said tubular forms together including a heating device having a V-shaped terminal portion fitting between overlapping edge portions of said tubular form to heat the adjacent surfaces of said portions as the tubular form is moved through the machine and means for pressing said heated adjacent surfaces together.

7. A machine for making containers according to claim 6 further characterized in that the tubular end of said folding casing, said tube and said mandrel are substantially cylindrical in form.

8. A machine for making containers according to claim 6 further characterized by the provision of a horizontal supporting plate having a smooth top surface adjacent the nip between said first pair of vertically spaced rollers and a second horizontal plate parallel to and spaced slightly above said first plate whereby sheet material moving between said plates is engaged by said rollers and progressed, a pair of horizontal slightly vertically spaced plates adjacent to the nip between said second pair of vertically spaced rollers and downstream therefrom to receive said successive severed pieces of flexible sheet material, and a roller disposed below the lower of said second pair of plates, the lower of said plates having an opening through which the top of said roller extends for engaging and moving said severed pieces.

References Cited in the file of this patent
UNITED STATES PATENTS

| | | |
|---|---|---|
| 594,222 | Alexander | Nov. 23, 1897 |
| 644,025 | White et al. | Feb. 20, 1900 |
| 730,410 | Staude | June 9, 1903 |
| 840,502 | Levalley | Jan. 8, 1907 |
| 1,202,121 | Stutz et al. | Oct. 24, 1916 |
| 2,080,301 | Bocchino | May 11, 1937 |
| 2,083,969 | Walter | June 15, 1937 |
| 2,143,593 | Bryant | Jan. 10, 1939 |
| 2,148,884 | Walter | Feb. 28, 1939 |
| 2,247,069 | Sargent et al. | June 24, 1941 |
| 2,285,263 | Fitch | June 2, 1942 |
| 2,331,351 | Seeley | Oct. 12, 1943 |
| 2,403,995 | Peters | July 16, 1946 |
| 2,423,554 | Davidson | July 8, 1947 |
| 2,466,823 | Poppe | Apr. 12, 1949 |
| 2,468,777 | Peters | May 3, 1949 |
| 2,639,772 | Sandberg et al. | May 26, 1953 |
| 2,743,003 | Allen | Apr. 24, 1956 |